United States Patent
Mendoza Vicioso

(10) Patent No.: US 6,899,439 B2
(45) Date of Patent: May 31, 2005

(54) REGULATION MECHANISM FOR EXTERIOR REAR-VIEW MIRRORS FOR MOTOR VEHICLES

(75) Inventor: Jose Mendoza Vicioso, La Roca del Valles (ES)

(73) Assignee: Fico Mirrors, S.A., Barcelona (ES)

(*) Notice: Subject to any disclaimer, the term of this patent is extended or adjusted under 35 U.S.C. 154(b) by 71 days.

(21) Appl. No.: 10/473,425

(22) PCT Filed: Mar. 14, 2002

(86) PCT No.: PCT/ES02/00117
§ 371 (c)(1),
(2), (4) Date: Sep. 30, 2003

(87) PCT Pub. No.: WO02/079002
PCT Pub. Date: Oct. 10, 2002

(65) Prior Publication Data
US 2004/0105181 A1 Jun. 3, 2004

(30) Foreign Application Priority Data
Mar. 30, 2001 (ES) .......................... 200100744

(51) Int. Cl.[7] .............................................. G02B 7/182
(52) U.S. Cl. ...................... 359/877; 248/479; 248/636
(58) Field of Search ................................ 359/872, 876, 359/877; 248/476, 479, 487, 636

(56) References Cited

U.S. PATENT DOCUMENTS

| 4,171,873 A | 10/1979 | Repay et al. |
| 4,628,760 A | 12/1986 | Huddleston |
| 5,546,240 A | 8/1996 | Perry et al. |
| 6,168,279 B1 * | 1/2001 | Schnell ........................ 359/872 |
| 6,325,520 B1 | 12/2001 | Hanft et al. |
| 6,715,377 B1 * | 4/2004 | Brouwer ....................... 74/431 |
| 6,830,353 B2 * | 12/2004 | Wolf et al. .................. 359/877 |

FOREIGN PATENT DOCUMENTS

| DE | 19919526 | 7/2000 |
| EP | 0 894 671 | 3/1999 |

* cited by examiner

Primary Examiner—Mark A. Robinson
(74) Attorney, Agent, or Firm—Sughrue Mion, PLLC

(57) ABSTRACT

The regulating mechanism comprises a base member (2), which can be coupled to the mounting (1), and a cover (3), in which a mirror mounting plate (31), provided with a mirror glass (35), is assembled. The mounting (1), and/or the cover (3), are provided with positioning means (9, 26; 37, 38; 42) of the mirror mounting plate (31), enabling said plate (31) to be positioned in any of the positions habitually used, either manually or through a mechanical or electrical control device. The base member (2) and the cover (3) or the base member (2) and the mirror mounting plate (31) have respective and complementary dampening means which comprise, in the base member (2), dampening means (32), and in the cover (3), or in the mirror mounting plate (31), a dampening extension (23).

3 Claims, 4 Drawing Sheets

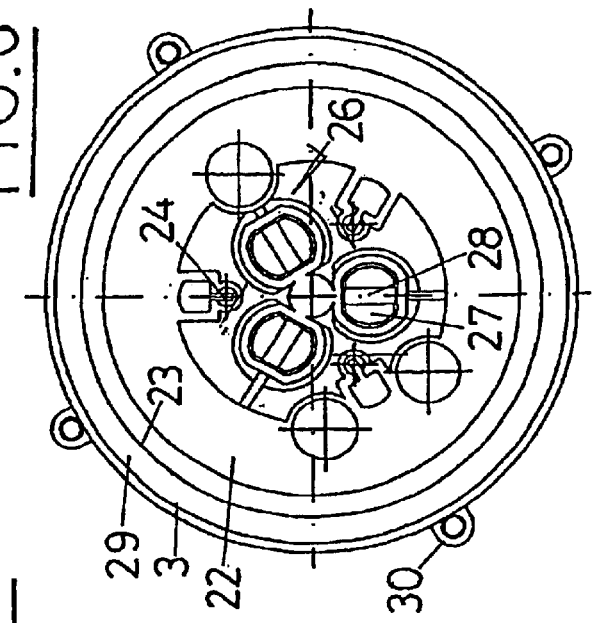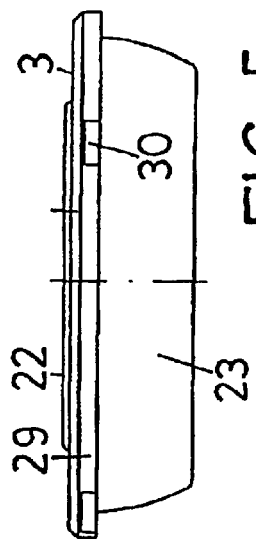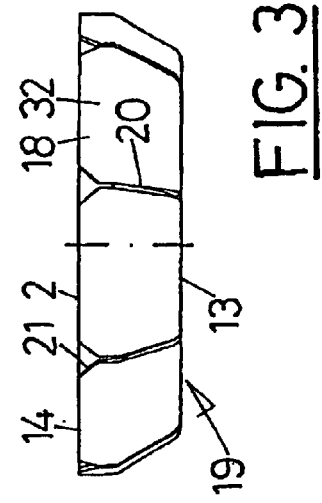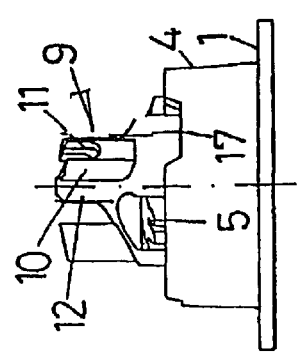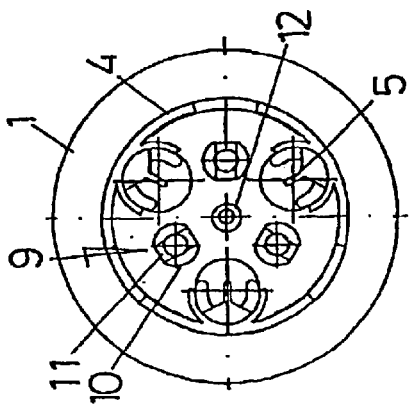

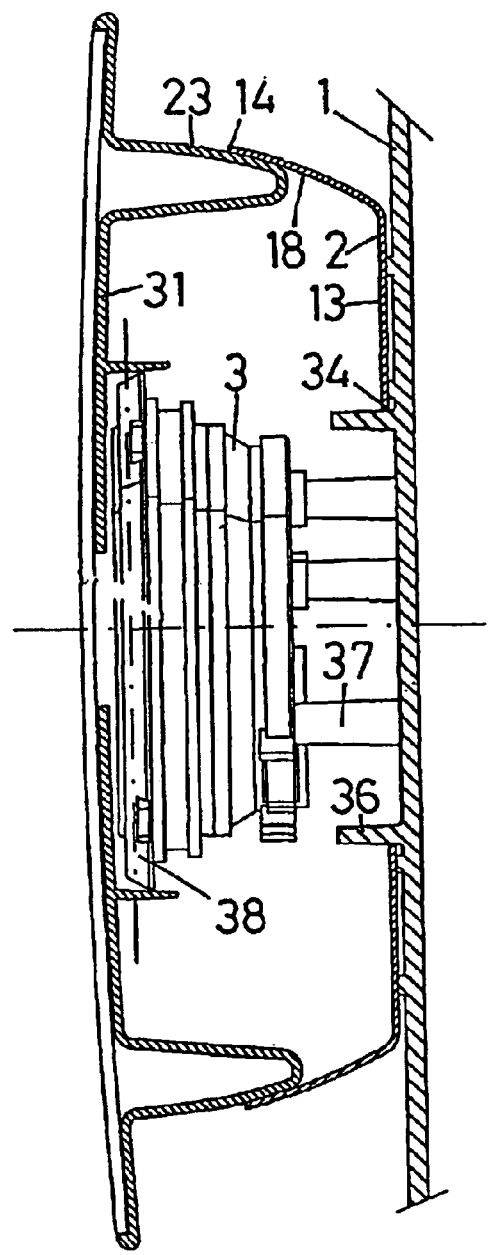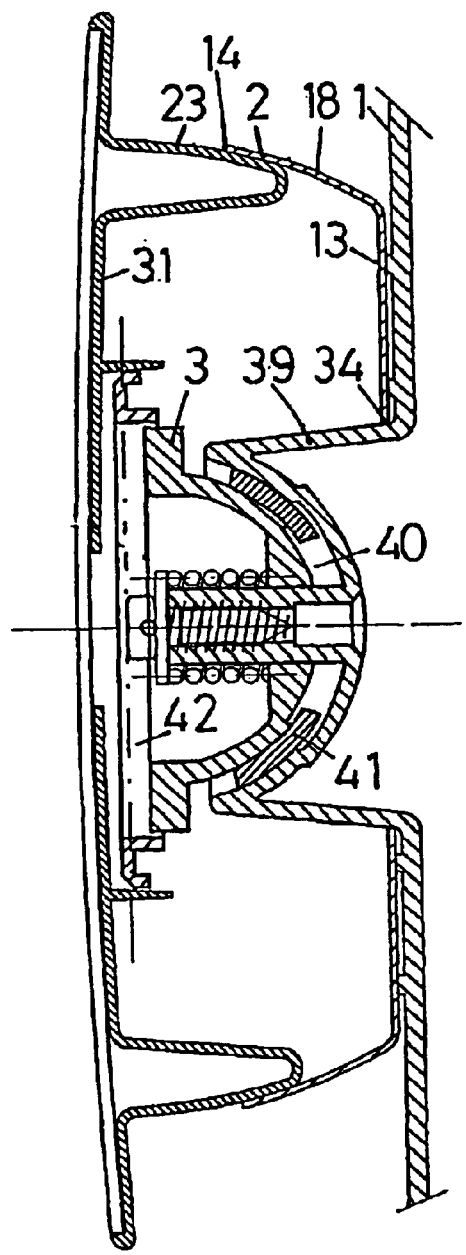

REGULATION MECHANISM FOR EXTERIOR REAR-VIEW MIRRORS FOR MOTOR VEHICLES

This Application is a 371 of PCT/ES02/00117, filed Mar. 14, 2002; the disclosure of which is incorporated herein by reference.

TECHNICAL SECTOR OF THE INVENTION

The object of the invention is a regulating mechanism for exterior rear view mirrors of motor vehicles, applicable to rear view mirrors, of the type made up of a support-holder and a support arm, mutually coupled and secured to the vehicle structure and of a mounting which can be coupled to the support arm, the regulating mechanism comprising a base member and a cover, in which the base member is coupled to the mounting, whereas the cover is coupled to the base member and is adapted for receiving a mirror mounting plate onto which a mirror glass is assembled, all being arranged in such a way that the user may position the mirror in any of the positions habitually used, whether manually or by means of a mechanical or electrical control device.

BACKGROUND OF THE INVENTION

Numerous embodiments of regulating mechanisms for exterior rear view mirrors of motor vehicles are known of the type described earlier. The base member secured to the mirror mounting and the cover to be coupled to the base member of said mechanisms are described below. In general, the base member has a generally spherical segment shape with a closed smaller base and with an open larger base adapted for receiving the cover as if it were a knuckle, the smaller base of the base member and the cover having respective and complementary positioning means of the cover with respect to the base and thus positioning the mirror mounting plate and the mirror glass as regards the mounting. Furthermore, the base member and the cover are provided with vibration dampening means, which essentially consist of the elastic deformation of the base member about the cover, the main purpose of which is to absorb the vibrations caused by the vehicle when in motion being transmitted to the mirror mounting plate, vibrations which affect the stability of the image given by the mirror assembled onto the same and, as a consequence, making the driving of the motor vehicle difficult.

A known form of embodiment of positioning means of the cover guided by means of a mechanical control device through cables, is described below. The smaller base of the base member is fitted with an outwardly directed perpendicular centred protuberance and has securing means at the ends of the steel cable sheath of the control cables, whereas the cover is fitted with a central portion provided with securing means of the ends of the steel cable ends. In addition, the centred protuberance of the base member and the central portion of the cover are provided with respective and complementary support means, adapted in such a way that when the user acts on the control device, it is transmitted through the control cables to the cover, which, by pivoting over the support means then occupies the desired position.

In the known embodiments of regulating mechanisms the positioning means and dampening means are arranged on the base member and on the cover, which presents the drawbacks described below. For a specific base member and cover the dampening means operate in suitable conditions up to specific dimensions of the mirror mounting plate secured to the cover, but from which the dampening means do not succeed in sufficiently absorbing the vibrations transmitted to the mirror mounting plate because of the vehicle's motion, even when the vehicle is stationary, and occurs under certain inoperative conditions; as a consequence of the previous drawback, several models of base member and cover suited to the mirror mounting assembly dimensions are needed, leading to a costly regulating mechanism.

EXPLANATION OF THE INVENTION

The regulating mechanism for exterior rear view mirrors of motor vehicles object of the invention comprises a base member which can be coupled to the mounting;

a cover into which a mirror mounting plate provided with a mirror glass is assembled;

positioning means of the mirror mounting plate with respect to the mounting arranged in the mounting and/or in the cover dampening means of the vibrations of the mirror mounting plate, caused by the vehicle when in motion, said dampening means being arranged in a lateral wall of the base member and in the cover or in the mirror mounting plate;

a through hole in said base member adapted for the passing through of the positioning means of the mounting; and It is also characteristic of the regulating mechanism object of the invention the fact that the dampening means comprise, on the lateral wall of the base member a plurality of slots, which originating on the hole edge, extend perpendicularly to the same, whereas on the cover, or on the mirror mounting plate, there is a dampening extension adapted for supporting by putting pressure on the dampening flaps of the base member.

According to another feature of the regulating mechanism of the invention, the base member has a generally spherical segment shape.

The features of the regulating mechanism for exterior rear view mirrors of motor vehicles according to the invention described earlier, offer an innovative and very economical solution to the drawbacks that known embodiments of regulating mechanisms present, in which the positioning means are arranged about the base member and on the cover itself. In the regulating mechanism of the invention, the fact that the positioning means are arranged in the mounting and/or in the cover, offers the advantages which are detailed below. The cover's resting on the mounting, unlike the known embodiments of regulating mechanisms in which the cover rests on the base member, enables the base member to solely carry out dampening functions of the vibrations transmitted to the mirror mounting plate, as for the positioning means of the mirror mounting plate and the vibration dampening means on distinct elements; on the other hand, and as a consequence, the base member can adopt a configuration and dimensions corresponding to those of the cover or the mirror mounting plate, all of this enabling the dempaning means to act efficiently on rear view mirrors fitted with mirrors of large dimensions, as occurs, for example, with industrial transport vehicles.

BRIEF DESCRIPTION OF THE DRAWINGS

Three forms of embodiment of the regulating mechanism for exterior rear view mirrors of motor vehicles object of the invention are illustrated in the attached drawings by way of non-limiting example: a first form of embodiment in which the mechanism is guided by a mechanical control device; a second form of embodiment of the mechanism guided by means of an electrical control device; and a third form of embodiment with manual guiding:

FIGS. 1 and 2 are, respectively, a side view and plan view, of the positioning means in the mounting of an exterior rear view mirror, of the first form of embodiment of the mechanism of the invention;

FIGS. 3 and 4 are, respectively, a side view and a plan view, of the base member of the first form of embodiment of the mechanism of the invention;

FIGS. 5 and 6 are, respectively, a side view and a plan view, of the cover of the first form of embodiment of the mechanism of the invention;

FIG. 10 is a section view of the second form of embodiment of the mechanism of the invention; and FIG. 11 is a section view of the third form of embodiment of the mechanism of the invention.

DETAILED DESCRIPTION OF THE EMBODIMENT EXAMPLE

Figure 7:
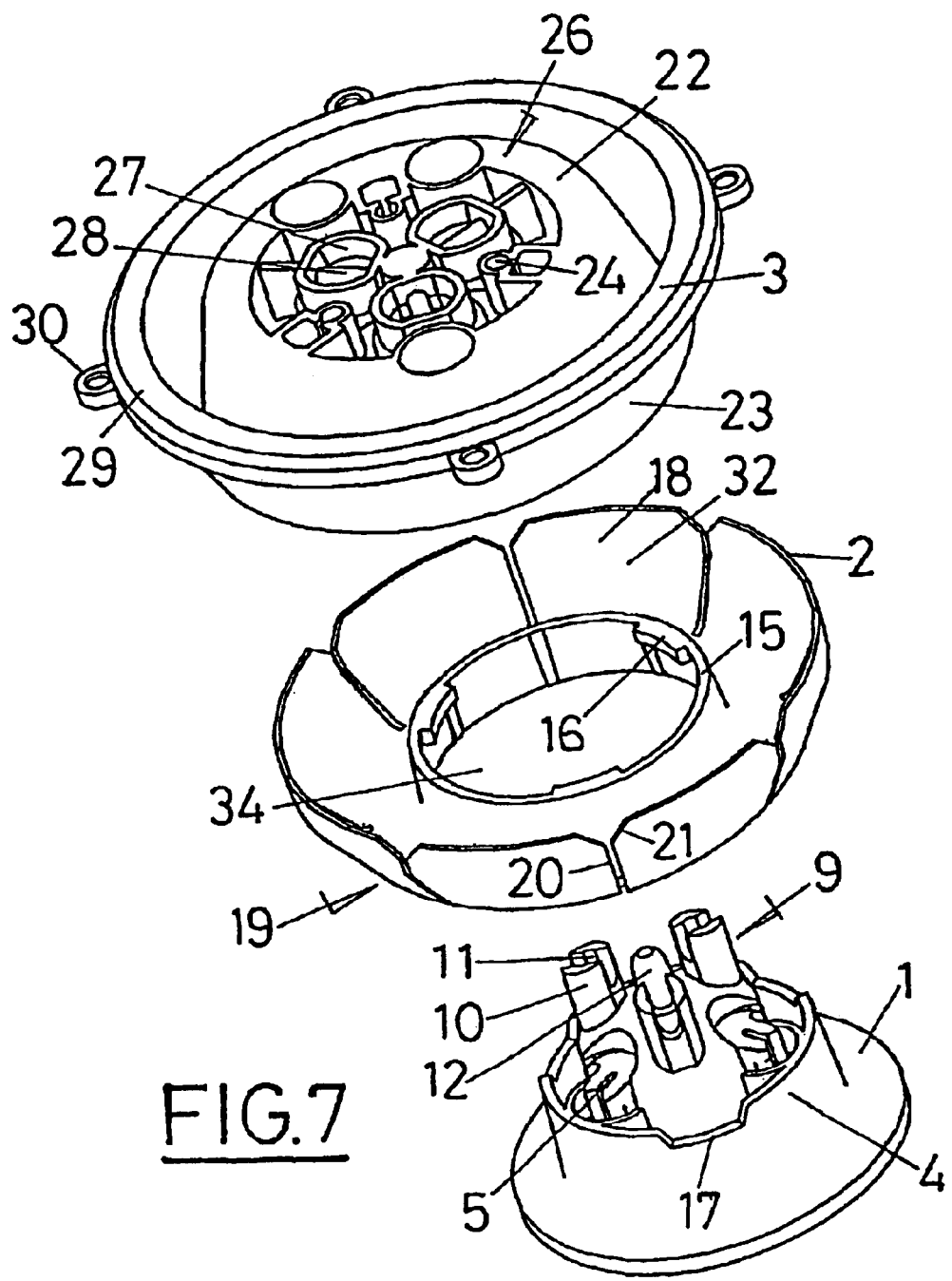
FIG. 7 is a perspective view of the positioning means of the mounting, the base member and the cover of the first form of embodiment of the mechanism of the invention, prior to coupling.
Figure 8:
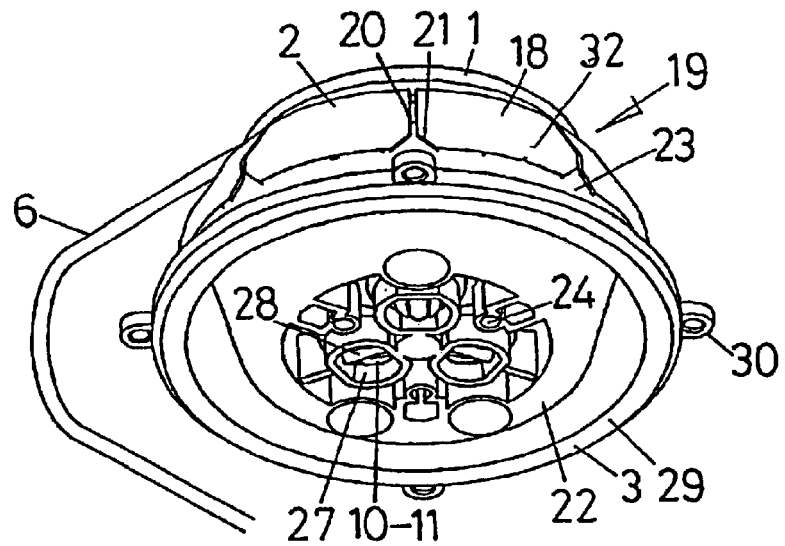
FIG. 8 is a perspective view of the first form of embodiment of the mechanism of the invention.
Figure 9:
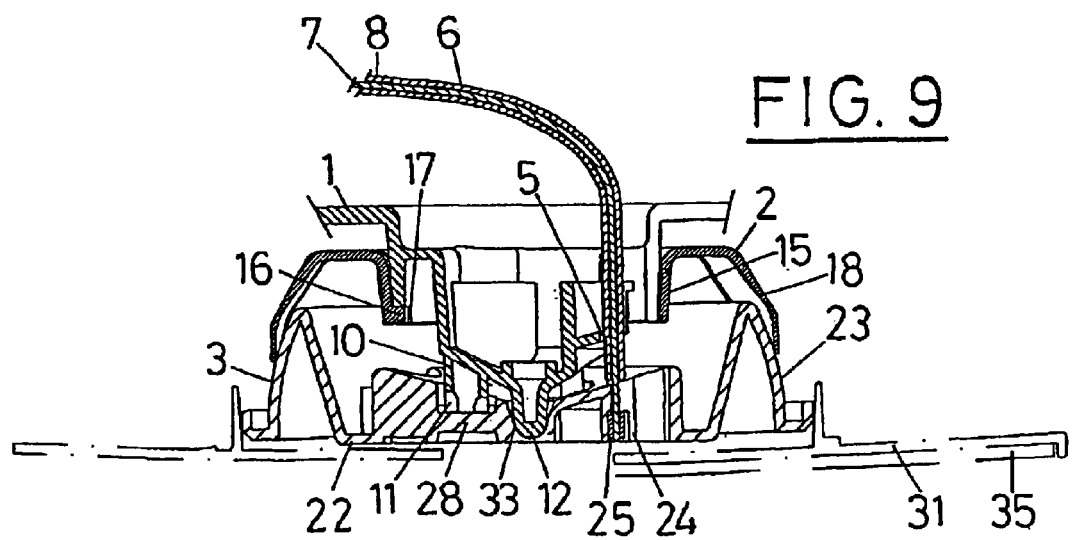
FIG. 9 is a section view of the first form of embodiment of the mechanism of the invention.

The first form of embodiment of the regulating mechanism for exterior rear view mirrors of the invention is shown in FIGS. 1 to 9, wherein the guiding of the mechanism is carried out by a mechanical control device, by means of control cables. The regulating mechanism described, is applicable to an exterior rear view mirror, of the type comprising a support arm and a support-holder, which can be mutually coupled and secured to the vehicle structure, not represented here, and a mounting 1, capable of being coupled to the support arm, and of which a corresponding portion at the bottom of the same is represented in FIGS. 1, 2, 7, 8 and 9. The regulating mechanism according to the invention comprises a base member 2 and a cover 3 which can be coupled to each other and with the mounting 1 as is illustrated in FIGS. 8 and 9.

The mounting 1 is provided with an outwardly directed protuberance 4 and equipped with three through orifices 5, distributed as can be appreciated in FIGS. 1, 2 and 7, each orifice 5 being adapted for receiving a control cable 6, made up of a steel cable 7 and a sheath 8, so that the corresponding end of the sheath 8 is secured, at the same time allowing the free passing in both directions of the steel cable 7, as detailed in FIG. 9, the control cables 6 connecting the manual regulating mechanism according to the invention to the control device in the vehicle's interior, not shown here. The protuberance 4 also has positioning means 9 which comprise three extensions 10 with respective slots 11 at its ends, distributed according to the detail in FIGS. 1, 2 and 7, and a centred cylindrical extension 12, fitted with a semispherical finishing at its end, as can be appreciated in FIGS. 1 and 9.

In FIGS. 3, 4 and 7 it can be appreciated that the base member 2 essentially has a generally spherical segment shape with a base member of smaller diameter 13 and a base of greater diameter 14, both of which are open. The smaller diameter base 13 has a through orifice 34 adapted for allowing the protuberance 4 of the mounting 1 to pass through it, and the orifice 34 being provided with an outwardly directed rim 15, detailed in perspective view in FIG. 7, and in plan and section view, in FIGS. 4 and 9 respectively, and with three evenly distributed protuberances 16, as can be appreciated in FIGS. 4 and 7, dimensioned to be tightly fitted in respective slots 17 of the protuberance 4 of the mounting 1 as detailed in FIG. 9, all being adapted in such a way that once the base member 2 is coupled to the protuberance 4 of mounting 1, by means of said protuberances 16 and slots 17, the base member 2 maintains its relative position with respect to mounting 1.

In FIGS. 3, 4, 7 and 8 it can be observed that the base member 2 has dampening means 19 on its lateral wall 18, composed of eight identical and evenly distributed slots 20 which, starting from the edge of the greater diameter base 14, extend perpendicularly with respect to the smaller diameter base 13, fitted with a V-shaped expansion at its outer end, thus shaping eight dampening flaps 32.

The cover 3 comprises a central portion 22 and a dampening extension 23 as if it were an outer wall, as can be observed in FIGS. 5 to 9. The central portion 22 is provided with slots 24 adapted for receiving a respective terminal 25 the ends of the steel cables 8 of the control cables 6 being provided thereof, as detailed in FIG. 9, and positioning means 26, complementary to positioning means 9, of mounting 1. The positioning means 26 comprise through orifices 27 provided with respective transversal shafts 28, illustrated in FIGS. 6 to 8, adapted for receiving corresponding extensions 10 of the mounting 1 and so that the transversal shafts 28 are slotted into the grooves 11 of said extensions, as detailed in FIGS. 8 and 9, and a central orifice 33 adapted for receiving the centred extension 12 of the mounting 1, as detailed in FIG. 9. The dampening extension 23 of the cover 3 presents a rotating outline adapted for being tightly received in the interior of the base member 2, resting on the dampening flaps 32 of its lateral wall 18 and in the way outlined in FIGS. 8 and 9. The outer edge 29 of the cover 3 is provided with four evenly distributed identical radial fastening extensions 30, as can be observed in FIGS. 6 to 8, intended for securing a mirror mounting plate 31, represented diagrammatically by means of dotted lines in FIG. 9.

The operation of the first form of embodiment of the regulating mechanism for rear view mirrors of motor vehicles is described in detail below. Having secured the ends of the sheaths 8 of the control cables 6 to the orifices 5 of the protuberance 4 of the mounting 1 of the exterior rear view mirror, and once the base member 2 is coupled to the protuberance 4 of the mounting 1 by means of the protuberances 16 and slots 17 of which they are respectively provided, and having secured the ends of the steel cables 7 of the control cables 6 to the slots 24 of the cover 3, as detailed in FIG. 9, the dampening extension 23 of the cover 3 rests on the dampening flaps 32 of the base member 2. In these conditions the regulating mechanism can be guided from the control device so that the cover 3, as well as the mirror mounting plate 31 and the mirror glass 35 assembled within, can occupy with respect to the mounting 1, any position among those habitually used. The vibrations produced by the vehicle in motion that reach the mounting 1 of the rear view mirror, are absorbed by the absorbing extension 23 of the cover 3 with the absorbing flaps 32 of the base member 2, by the elastic deformation of the absorbing flaps 32, resulting in the mirror mounting plate being free of the action of said vibrations and consequently without the image provided by the mirror glass 35 assembled in the same being affected.

It should be emphasised at this point that the generally spherical segment shape given to the base member 2 is given for embodiment example purposes only, since, as is characteristic of the invention, the fact that the positioning means 9 and 26 of the cover 3 are arranged in the mounting 1 and in the cover itself 3, it enables the base member 2 to solely carry out dampening functions, for which it can adopt any suitable configuration in relation to the dimensions of the mirror mounting plate assembled in the cover; to be exact, the dampening flaps of the base member will be arranged in such a way that they receive a corresponding dampening extension of the cover.

In FIG. 10, the second form of embodiment of the regulating mechanism of the invention is shown, in which the guiding of same is done by means of an electrical control device, not represented. For the purposes of simplification, in the description that follows of the second form of embodiment of the mechanism of the invention, numerical references from the first form of embodiment are used to represent equivalent elements.

The second form of embodiment of the regulating mechanism of the invention comprises a base member 2, a cover 3 and a mirror mounting plate 31 which can be coupled to each other and with a mounting 1, as represented in FIG. 10. The mounting 1 has coupling extensions 36 which are adapted for the coupling of the base member 2, positioning means consisting of securing means 37 adapted for the securing of the cover 3 provided with an electrical positioner 38 of the mirror mounting plate 31, and orifices, not shown, to allow for the passing through of the electrical conductors of the positioner 38. The base member 2 has an open smaller base 13 and an open larger base 14, the smaller base 13 being provided with a through orifice 34 to enable the securing extensions 37 and the electrical conductors of the electrical positioner 38 to pass through, and a lateral wall 18 provided with dampening means, not shown, consisting of dampening flaps similar to the dampening flaps 32 represented in FIGS. 3 and 4 from the first form of embodiment of the regulating mechanism of the invention. The mirror mounting plate 31 comprises a dampening extension 23 adapted for being received by the base member 2, resting on the dampening flaps of the lateral wall 18.

In this second form of embodiment of the regulating mechanism of the invention, and as in the first form of embodiment, the base member 2 only performs a dampening function, and that is because the positioning means of the mirror mounting plate 31 are arranged in the cover 3 and in the mounting 1, as can be appreciated in FIG. 10.

In FIG. 11 the third form of embodiment of the regulating mechanism of the invention is represented, with manual guiding. Also, for simplification purposes of the description which follows of the third form of embodiment of the mechanism of the invention, numerical references from the first form of embodiment are used to represent functionally similar elements.

The third form of embodiment of the regulating mechanism of the invention comprises a base member 2, a cover 3 and a mirror mounting plate 31 which can be coupled to each other and with a mounting 1, as represented in FIG. 11. The mounting 1 has an outwardly directed truncated cone protuberance 39 and is fitted at its outer end with a spherical slot 40, adapted for receiving the cover and elastic elements 41 being positioned between the spherical slot 40 and the cover 3. The base member 2 has an open smaller base member 13 and an open larger base member 14, the smaller base member 13 being provided with a through orifice 34 for the truncated cone protuberance to pass through, and a lateral wall 18 with dampening means, not represented, consisting of dampening flaps similar to the dampening flaps 32 represented in FIGS. 3 and 4 of the first form of embodiment of the mechanism of the invention. The cover 3 has positioning means of the mirror mounting plate 31 consisting of a crossed line 42. The mirror mounting plate 31 comprises a dampening extension 23 adapted for being tightly fitted into the base member 2, resting on the dampening flaps of the lateral wall 18.

In this third form of embodiment of the mechanism of the invention, the base member again only performs a dampening function as the positioning means of the mirror mounting plate 31 are arranged in the cover 3, as can be appreciated in FIG. 11.

What is claimed is:

1. A regulating mechanism for exterior rear view mirrors of motor vehicles, comprising:

a base member (2) that can be coupled to a mounting (1);

a cover (3) in which a mirror mounting plate (31) provided with a mirror glass (35) is assembled;

positioning means (9, 26; 37, 38; 42) of the mirror mounting plate (31) with respect to the mounting (1) arranged in the mounting (1) and/or in the cover (3);

dampening means (23, 32) of vibrations from the mirror mounting plate (31) produced by the vehicle in motion, said dampening means (23, 32) arranged in a lateral wall (18) of the base member (2) and in the cover (3) or in the mirror mounting plate (31), a through orifice (34) in said base member (2) adapted for the passing through of the positioning means (9; 37) of the mounting; and an aperture in said base member (2) adapted for receiving, as if it were a knuckle, the cover (3) or the mirror mounting plate (31), wherein the dampening means comprise, in said the lateral wall (18) of the base member (2) a plurality of slots (20) which, starting from the edge of the aperture, extend perpendicularly to the same, configuring a plurality of dampening flaps (32), whereas in the cover (3) or in the mirror mounting plate (31) they comprise a dampening extension (23) adapted for resting and putting pressure on the dampening flaps (32) of the base member (2).

2. The regulating mechanism according to claim 1, wherein said lateral wall comprises eight identical and evenly distributed slots (20) fitted with a V-shaped expansion at its outer end, shaping eight dampening flaps (32).

3. The regulating mechanism according to claim 1, wherein the orifice (34) is provided with an outwardly directed rim (15) and with evenly distributed protuberances (16) to be tightly fitted in respective slots (17) of a protuberance (4) of the mounting.

* * * * *